United States Patent
Luft et al.

(10) Patent No.: US 8,024,430 B2
(45) Date of Patent: Sep. 20, 2011

(54) SYSTEM AND METHOD FOR INSTALLING SOFTWARE

(75) Inventors: David A. Luft, Northport, NY (US); Sarad Thapa, Commack, NY (US); Venkatesh Gandham, Andhra Pradesh (IN)

(73) Assignee: Computer Associates Think, Inc., Islandia, NY (US)

( * ) Notice: Subject to any disclaimer, the term of this patent is extended or adjusted under 35 U.S.C. 154(b) by 793 days.

(21) Appl. No.: 11/353,395

(22) Filed: Feb. 14, 2006

(65) Prior Publication Data

US 2007/0088799 A1    Apr. 19, 2007

Related U.S. Application Data

(60) Provisional application No. 60/727,163, filed on Oct. 14, 2005.

(51) Int. Cl.
*G06F 15/177* (2006.01)
(52) U.S. Cl. ........ 709/220; 709/219; 709/225; 717/176; 717/178; 717/177
(58) Field of Classification Search .......... 709/220, 709/219, 225; 717/176, 178, 177
See application file for complete search history.

(56) References Cited

U.S. PATENT DOCUMENTS

| | | | | |
|---|---|---|---|---|
| 5,742,829 A | * | 4/1998 | Davis et al. | 717/178 |
| 5,931,909 A | * | 8/1999 | Taylor | 709/221 |
| 6,151,643 A | * | 11/2000 | Cheng et al. | 710/36 |
| 6,202,206 B1 | * | 3/2001 | Dean et al. | 717/177 |
| 6,865,737 B1 | * | 3/2005 | Lucas et al. | 717/178 |
| 6,920,502 B2 | * | 7/2005 | Araujo et al. | 709/229 |
| 2002/0078203 A1 | * | 6/2002 | Greschler et al. | 709/225 |
| 2003/0005104 A1 | | 1/2003 | Deboer et al. | 709/223 |
| 2004/0088700 A1 | | 5/2004 | Lee et al. | 717/178 |
| 2006/0031407 A1 | * | 2/2006 | Dispensa et al. | 709/219 |

FOREIGN PATENT DOCUMENTS

JP    09218777 A  *  8/1997

OTHER PUBLICATIONS

Hickerson et al, Engineering workstations-managing network workstations, Apr. 1992, vol. 29 issue 4, pp. 1-3.*
Notification of Transmittal of The International Search Report and The Written Opinion of the International Searching Authority, or the Declaration re PCT/US2006/040300 filed Oct. 12, 2006, Jan. 17, 2007.

* cited by examiner

*Primary Examiner* — Wing F. Chan
*Assistant Examiner* — Hitesh Patel
(74) *Attorney, Agent, or Firm* — Baker Botts L.L.P.

(57) ABSTRACT

A method for installing software includes receiving configuration information at a server and installing a server software module on the server. The method further includes transmitting a client software module associated with the server software module to a plurality of clients and initiating, from the server, installation of the client software module on the plurality of clients. Additionally, the method includes configuring the client based, at least in part, on the configuration information received by the server.

19 Claims, 3 Drawing Sheets

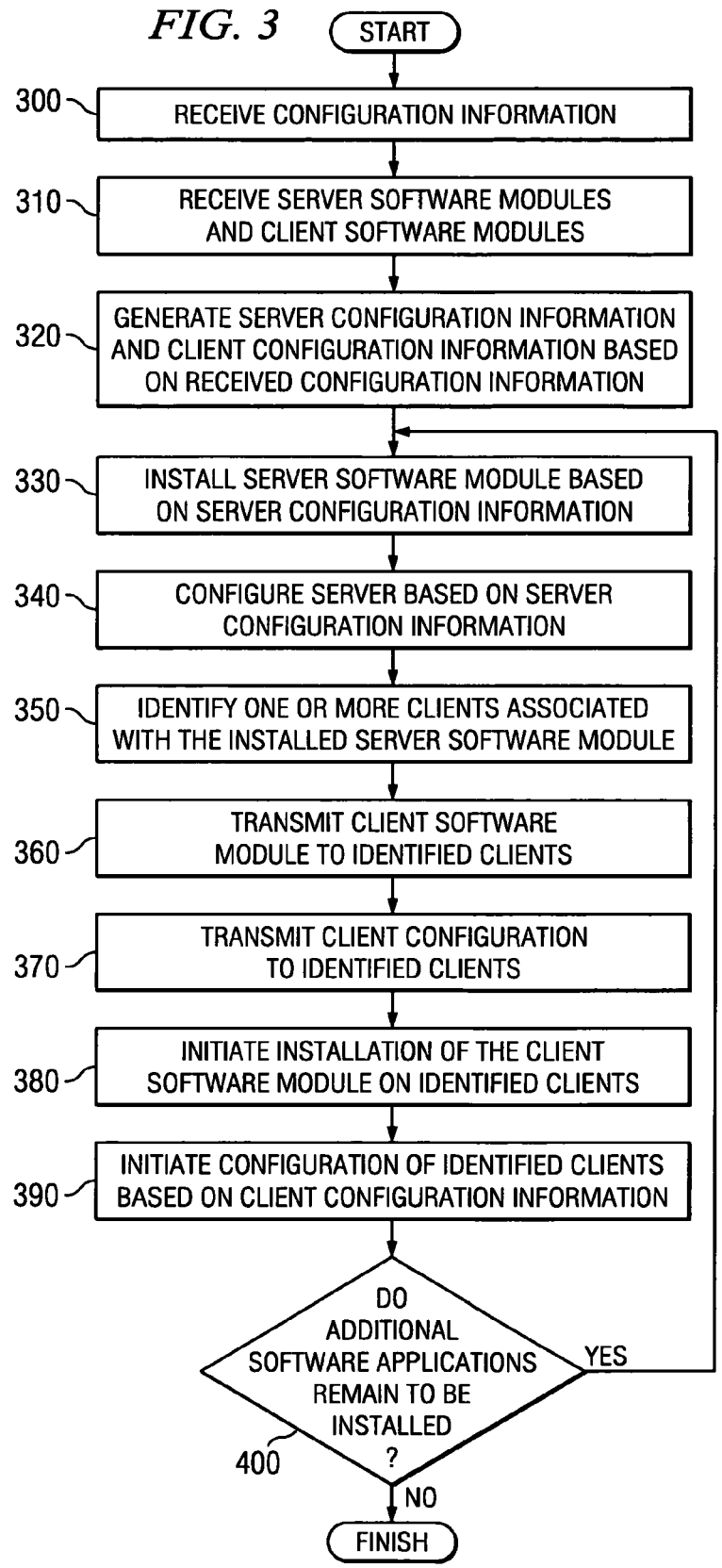

SYSTEM AND METHOD FOR INSTALLING SOFTWARE

RELATED APPLICATIONS

This application claims the priority benefit of U.S. Provisional Application Ser. No. 60/727,163 filed Oct. 14, 2005.

TECHNICAL FIELD OF THE INVENTION

This invention relates in general to computer software and, more particularly, to a system and method for installing computer software.

BACKGROUND OF THE INVENTION

Many modern computer systems are designed to provide a wide variety of functionalities to a distributed collection of users. In many cases, computer systems are designed to support a flexible set of services that can be expanded by installing additional software applications. Because many computing systems are tasked with providing a wide variety of complex services to users, installation and configuration of the necessary applications can be a time-consuming process. Additionally, manual installation and configuration of the applications can often lead to user-induced errors. Moreover, for distributed systems in which functionality is provided jointly by clients and servers, coordinating the installation and configuration of software applications can be even more difficult and time-consuming.

SUMMARY OF THE INVENTION

In accordance with the present invention, certain disadvantages and problems associated with installing computer software have been substantially reduced or eliminated. In particular, techniques for expediting and simplifying the installation of computer software are provided.

In accordance with one embodiment of the present invention, a method for installing software includes receiving configuration information at a server and installing a server software module on the server. The method further includes transmitting a client software module associated with the server software module to a plurality of clients and initiating, from the server, installation of the client software module on the plurality of clients. Additionally, the method includes configuring the client based, at least in part, on the configuration information received by the server.

In accordance with another embodiment of the present invention, a system for installing software includes a network, a server, and a plurality of clients. The network couples the server and the plurality of clients. The plurality of clients are each capable of executing instructions associated with one or more client software modules. Additionally, the server is capable of receiving configuration information and installing a server software module on the server. The server is also capable of transmitting a client software module to the plurality of clients and initiating installation of the client software module on the plurality of clients. Additionally, the server is capable of configuring the plurality of clients based, at least in part, on the received configuration information.

Technical advantages of certain embodiments of the present invention include the ability to automate and streamline, at least in part, the installation of software applications on a distributed computing system. Additional technical advantages include the reuse of common configuration information between components, time-savings in the installation process, reductions in user error during data-entry, and the ability to limit client-side access to configuration settings. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a flowchart illustrating operation of a particular embodiment of the server shown in FIG. 2A.

DETAILED DESCRIPTION OF THE INVENTION

Figure 1:
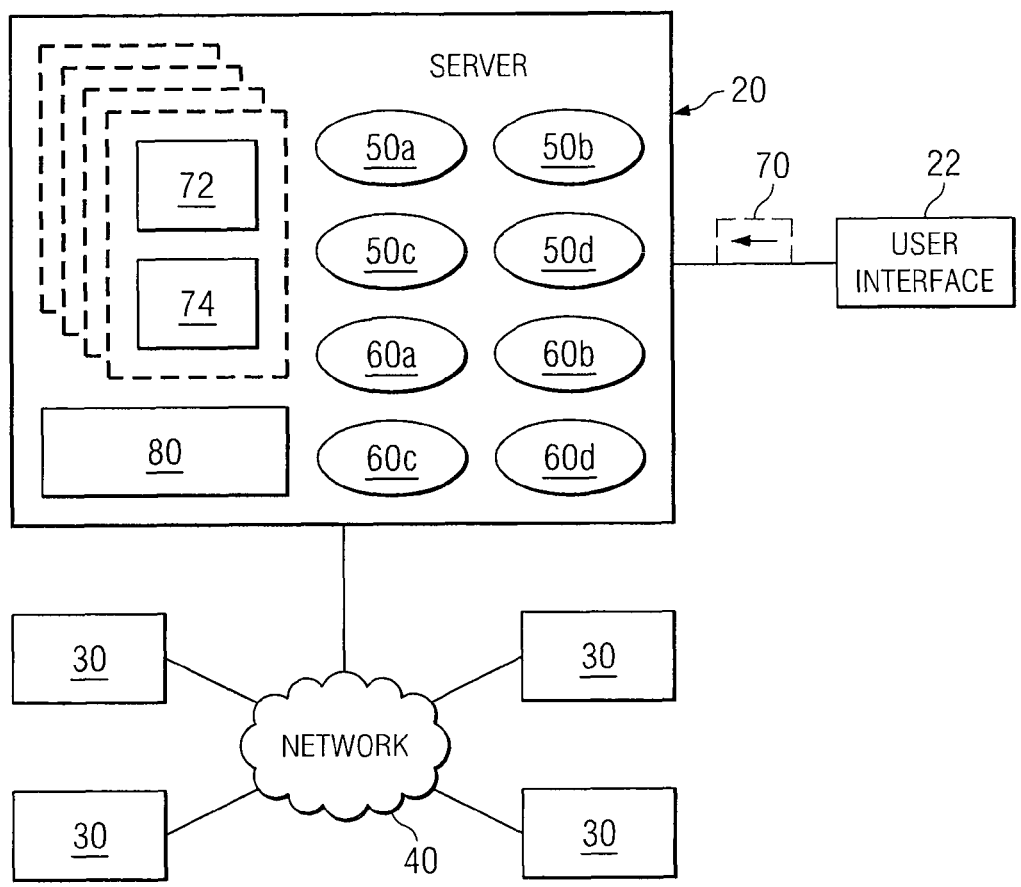
FIG. 1 illustrates a computer system that supports one or more software applications.

FIG. 1 illustrates a system 10 according to a particular embodiment of the present invention. As shown, system 10 includes a server 20 and a plurality of clients 30 coupled through a network 40. System 10 provides computing, processing, and/or data-management services to users of system 10 through the operation of server 20 and clients 30. In particular embodiments, server 20 and clients 30 operate in conjunction with one another to provide one or more of the services offered by system 10. More specifically, system 10 may support one or more software applications that rely on the operation of software modules executing on server 20 as well as software modules executing on clients 30. By streamlining and automating installation of related software modules on server 20 and clients 30, particular embodiments of system 10 may improve ease-of-use and limit user error during installation.

Server 20 provides functionality associated with the various software applications supported by system 10. As part of providing this functionality, server 20 may execute instructions included in and/or associated with one or more server software modules 50 of the relevant software applications. In particular embodiments, server 20 is configured to receive requests, instructions, and/or queries from clients 30 and to perform requested tasks or operations in response to these requests, instructions, and queries. Server 20 may include any appropriate combination of hardware and/or software suitable to provide the described functionality. The contents and operation of a particular embodiment of server 20 are described in greater detail below with respect to FIG. 2A.

User interface 22 facilitates interaction between a user of system 10 and server 20. User interface 22 may include components such as a keyboard, mouse, monitor, printer, display screen, and/or any other components appropriate to allow the user to input information into server 20 or receive information from server 20.

Clients 30 also provide functionality associated with the various software applications supported by system 10. As part of providing this functionality, clients 30 may execute instructions included in and/or associated with one or more client software modules 60 of the relevant software application. In particular embodiments, clients 30 are configured to transmit requests, instructions, and/or queries to server 20 to initiate certain tasks or operations associated with the software applications supported by system 10. Clients 30 may include any appropriate combination of hardware and/or software suitable to provide the described functionality. The contents and operation of a particular embodiment of client 30 are described in greater detail below with respect to FIG. 2B. Although not shown in FIG. 1, any of clients 30 may also include appropriate forms of user interfaces to facilitate the exchange of information between clients 30 and their respective users.

Network 40 provides connectivity between server 20, clients 30, and/or other components of system 10. Network 40 may represent any suitable form of network supporting communication using any appropriate communication protocols or standards. Additionally, network 40 may represent one or more separate networks. Network 40 may include routers, hubs, switches, gateways, call controllers, and/or any other suitable component in any suitable form or arrangement. In general, network 40 may comprise any combination of public or private communication equipment such as elements of the Publicly-Switched Telephone Network (PSTN), a global computer network such as the internet, a local area network (LAN), a wide-area network (WAN), or other appropriate communication equipment.

Server software modules 50 and client software modules 60 may represent any appropriate computer-readable instructions in any appropriate form. Based on the configuration of server 20, clients 30, and system 10 generally, software modules 50 and 60 may represent compiled, executable code; uncompiled, source code; and/or instructions in any other suitable form. Moreover, although referred to consistently throughout this description with the generic name "software modules," any of server software modules 50 and client software modules 60 may be modified in any appropriate manner during installation or at other times during operation of system 10. For example, in particular embodiments, software modules 50 and 60 may initially represent compressed code and this compressed code may be decompressed at an appropriate point during the installation process.

Any suitable types of software applications may be installed on system 10 and thus server software modules 50 and client software modules 60 may be associated with any appropriate functionality. FIG. 1 illustrates an example in which a network security server software module 50a, a virus protection server software module 50b, a data recovery server software module 50c, and a data migration server software module 50d are installed, along with corresponding client server software modules 60a-d. Network security software modules 50a and 60a manage access to server 20, clients 30, network 40, and/or other components of system 10 to reduce or eliminate unauthorized use of the relevant components. Virus protection software modules 50b and 60b monitor operation of server 20, clients 30, or other components of system 10 to detect, prevent, and/or remedy the presence, operation, or effects of unauthorized code. Data recovery software modules 50c and 60c manage the archival and/or retrieval of data stored on server 20 and clients 30. Data migration software modules 50d and 60d provide functionality associated with transferring information from one component of system 10 to another. For example, data migration software modules 50d and 60d may provide functionality that allows a user at one client 30 to utilize desktop settings set by the user at another client 30.

Particular embodiments of system 10 may also support the use of licenses to allow a software provider to manage use of software modules 50 and 60 provided by that software provider. Such embodiments may utilize any appropriate techniques to facilitate the issuance, use, and termination of the relevant licenses. For example, in the illustrated embodiment, server 20 maintains, for each installed software application, license information 80 that specifies a number of licenses available to users of system 10, the number of licenses currently checked-out by users, and the identity of the clients 30 on which the users are using the checked-out licenses. In the illustrated example, server 20 is responsible for checking out licenses to users of various clients 30 in response to license requests and updating license information 80 to reflect current license usage on system 10.

Configuration information 70 specifies an initial configuration for server 20 and/or clients 30 with respect to particular software applications to be installed on server 20, indicates a set of clients 30 on which particular client software modules 60 should be installed, and/or provides any other appropriate parameters for installation and/or configuration of software on system 10. In general, configuration information 70 may include any appropriate information that is provided to server 20 or clients 30 prior to or during installation of software modules 50 and 60. In particular embodiments, server 20 may use configuration information 70 received by server 20 to generate one or more sets of server configuration information 72 and client configuration information 74. Each set of server configuration information 72 and client configuration information 74 may include some or all of configuration information 70 and may additionally include other information generated or retrieved by server 20. Examples of configuration information 70, server configuration information 72, and client configuration information 74 may include, but are not limited to, information identifying authorized users of system 10 and their corresponding passwords, port mappings for communication between server 20 and clients 30, software update schedules, data backup schedules, virus definitions, port mappings, user preferences, firewall or other security settings, addresses or other identifying information for components supporting particular services (such as mail servers and proxy servers), information specifying protocols supported by system 10, and license information associated with one or more of the applications supported by system 10. In general, however, the installation techniques below may be used with any appropriate type of configuration information 70, server configuration information 72, and/or client configuration information 74.

In operation, a user may install software applications on system 10 using a common install process that streamlines the installation of multiple applications over multiple components of system 10. As part of this common installation process, in particular embodiments, server 20 receives configuration information 70 from a user and/or another component of system 10 to be utilized by server 20 or clients 30 during installation of associated software applications. For example, in the illustrated embodiment of system 10, server 20 receives configuration information 70 from a user through user interface 22. Server 20 may additionally or alternatively receive configuration information 70 from another component of system 10, such as one of clients 30 or a memory device located within or coupled to server 20. In general, server 20 may receive configuration information 70 from any appropriate source based on the configuration and capabilities of server 20.

Upon receiving configuration information 70, server 20 may generate one or more sets of server configuration information 72 and one or more sets of client configuration information 74 based on the received configuration information 70. In particular embodiments, each set of server configuration information 72 is associated with a particular software application to be installed and includes all or a portion of configuration information 70 received by server 20. Similarly, in particular embodiments, each set of client configuration information 74 is associated with a particular software application to be installed and includes all or a portion of configuration information 70 received by server 20. Additionally, in particular embodiments, server 20 may generate or retrieve additional configuration information to supplement any set of server configuration information 72 or client configuration information 74. Furthermore, multiple sets of server configuration information 72 and/or client configuration information 74 may share certain portions of configuration information 70. As a result, the common installation process may reduce the number of times a user must enter the shared portions of configuration information 70. This may reduce the amount of time expended by the user in installing software applications and limit possibility of errors by the user in configuring server 20 and clients 30.

Furthermore, in particular embodiments, server 20 may store the collected and/or generated sets of server configuration information 72 and client configuration information 74 for later use, allowing the user to quickly repeat the installation and configuration of the same software applications with little effort. For example, in the illustrated embodiment, server 20 generates configuration profile 76 associated with each software application and stores a set of server configuration information 72 and a set of client configuration information 74 associated with a particular software application in the configuration profile 76 that corresponds to that software application. In particular embodiments, the user may then access the configuration profiles 76 to later repeat installation of the same software applications without re-entering the relevant configuration information 70.

In addition to configuration information 70, server 20 also receives one or more server software modules 50 and one or more client software modules 60. Each of server software modules 50 include computer-readable instructions associated with the operation of server 20 with respect to a particular software application to be installed on system 10, while each of client software modules 60 include computer-readable instructions associated with the operation of a client 30 with respect to a particular software application. For purposes of this description and the claims that follow, server 20 may receive software modules 50 and 60 by receiving software modules 50 and 60 from another component of system 10, by accessing a memory coupled to or within server 20, and/or by receiving software modules 50 and 60 in any other appropriate manner.

Server 20 then initiates installation of software associated with each application to be installed. As part of this process, server 20 installs one or more server software modules 50. Each server software module is associated with a particular set of server configuration information 72. While installing a particular server software module 50, server 20 accesses the server configuration information 72 associated with that server software module 50. Server 20 then configures server 20 and/or the relevant server software module 50 based on the accessed server configuration information 72.

After completing installation of a particular server software module 50, server 20 initiates installation of a client software module 60 associated with the same software application. In particular embodiments, system 10 may support multiple software applications but may be configured so that only a subset of clients 30 support one or more of these applications. For example, system may be configured so that a network management application is installed on only a select set of clients 30 that are associated with system administrators. Thus, in particular embodiments, server 20 may identify, for a particular application to be installed, one or more clients 30 on which that application will be installed. In such embodiments, configuration information 70 may include information identifying clients 30 on which server 20 should install the relevant client software module 60, and server 20 may identify the appropriate clients 30 based on this information.

After any appropriate identification of clients 30, server 20 initiates installation of the associated client software module on appropriate clients 30. As part of this process, server 20 may transmit a copy of the associated client software module 60 to each of the relevant clients 30. Additionally, in particular embodiments, server 20 may transmit to each of these clients 30 a copy of the client configuration information 74 associated with the transmitted client software module 60.

After the relevant clients 30 receive the client software module 60, these clients 30 install the received client software module 60. In particular embodiments, client software module 60 may include an executable program that clients 30 automatically execute upon receipt of the received client software module 60. In alternative embodiments, server 20 may transmit an installation instruction to the relevant clients 30 after these clients receive client software module 60, and the relevant clients 30 may then initiate installation of the received client software module 60 in response to the installation instruction.

Configuration of the installed client software modules 60 and/or the appropriate clients 30 is then completed based on the set of client configuration information 74 associated with the installed client software module 60. For example, if server 20 directly controls installation of client software modules 60 on clients 30, server 20 may configure client software module 60 or the client 30 on which this module is installed based on the corresponding client configuration information 74. As one example, server 20 may set the ports of client 30 that are to be used for communication with between server 20 and clients 30 during operation of the software application associated with the installed client software module 60. Alternatively, if server 20 initiates installation by transmitting an executable file to client 30 that performs the installation of client software module 60, server 20 may transmit client configuration information 74 to client 30, and client 30 may configure itself or the received client software module 60 based on the corresponding client configuration information 74. Thus, returning to the previous example, server 20, in such an embodiment, may transmit an executable file to the relevant clients 30 and those clients 30 may, as part of executing this file, configure itself or the received client software module 60 to use the port mapping identified by the received client configuration information 74 for any communication with server 20 originating from or destined to the software application.

After installation of the received client software module 60, the relevant clients 30 may activate the installed client software module 60. As part of activating the newly-installed client software module 60 in embodiments of system 10 that support license management, the relevant clients 30 may request a license for the associated software application from server 20 or another appropriate component of system 10. In response to the license request, server 20 may update license information 80 to reflect the fact that the requesting client 30 has checked out a license for the associated application. Server 20 may also transmit an acknowledgement message or another suitable form of message to the requesting client 30 indicating that client 30 has successfully checked out a license for the application. If the number of licenses currently checked out by clients 30 in system 10 is already equal to the maximum number of licenses that system 10 is authorized to use, server 20 may instead transmit a license failure message or other appropriate form of message to the requesting client 30.

Server 20 may then repeat this process for any remaining software applications to be installed, installing the associated server software module 50 and initiating installation of the associated client software module 60 on appropriate clients 30. Although this description focuses on an embodiment of system 10 in which server 20 installs a particular server software module 50 and then installs the associated client software module 60, in alternative embodiments of system 10, server 20 may instead install all server software modules 50 and then install the associated client software modules 60 after server software modules 50 have been installed. In general, server 20 may install server software modules 20 and client software modules 30 in any appropriate order.

Thus, by collecting configuration information 70 for both server 20 and clients 30 for a particular software application and/or by collecting configuration information 70 for multiple software applications prior to beginning installation, server 20 may streamline and simplify installation of the various applications. Additionally, by utilizing a common set of configuration information 70 to generate multiple sets of server configuration information 72 and/or client configuration information 74, server 20 may reduce the time a user spends repeatedly entering configuration information 70 to be utilized by multiple software applications and may also reduce the possibility of user error. As a result, particular embodiments of server 20 may provide multiple operational benefits. Nonetheless, particular embodiments of server 20 may provide all, some, or none of these benefits.

Figure 2A:
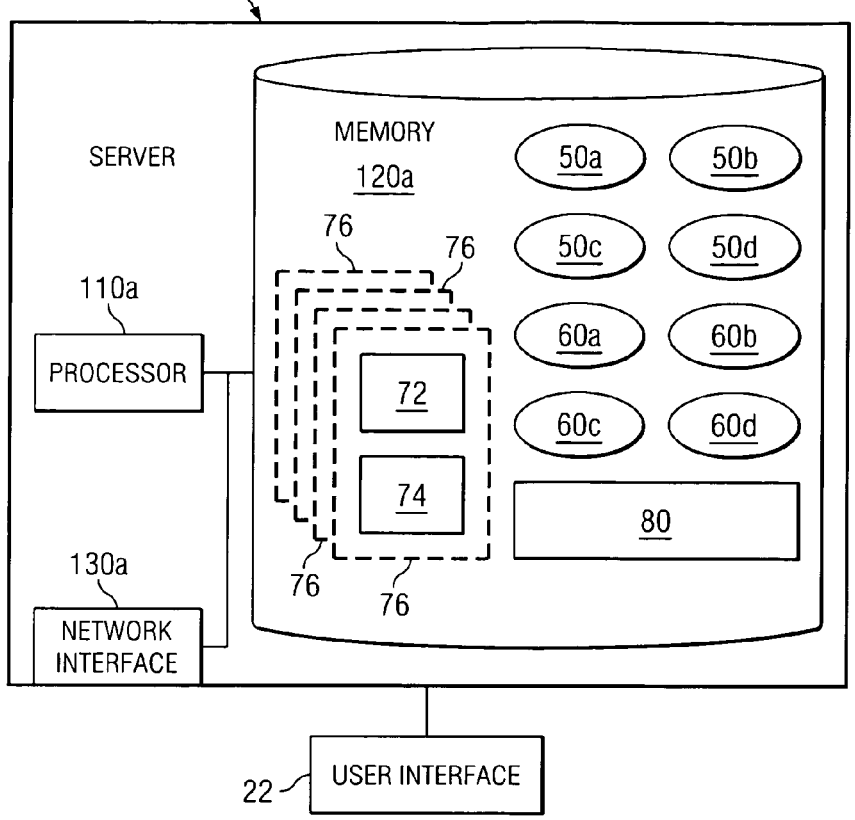
FIGS. 2A and 2B illustrate, respectively, a server and a client that may be included in the computer system of FIG. 1.
Figure 2B:
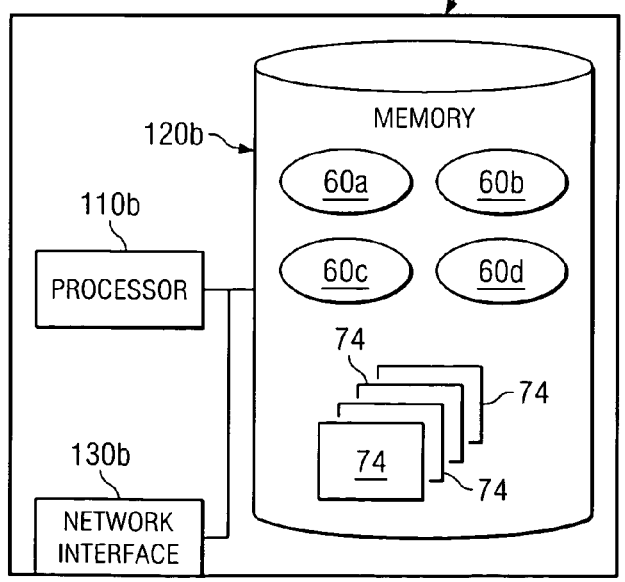

FIGS. 2A and 2B illustrate, respectively, the contents of particular embodiments of a server 20 and a client 30. In the illustrated embodiments, server 20 includes a processor 110a, a memory 120a, and a network interface 130a, while client 30 includes a processor 110b, a memory 120b, and a network interface 130b. Additionally, in the illustrated embodiment, server 20 couples to user interface 22 as described above with respect to FIG. 1. Alternative embodiments may include any appropriate components suitable to provide the described functionality.

Processors 110a and 110b (referred to generically as "processors 110" collectively or a "processor 110" singularly) are operable to execute instructions associated with the services provided by server 20 and clients 30. Processors 110 may represent any suitable devices capable of processing and/or communicating electronic information. Examples of processors 110 include, but are not limited to, application-specific integrated circuits (ASICs), field-programmable gate arrays (FPGAs), digital signal processors (DSPs) and any other suitable specific- or general-purpose processors.

Memories 120a and 120b (referred to generically as "memories 120" collectively or a "memory 120" singularly) store processor instructions and/or any other appropriate information used by server 20 and clients 30 in operation. In particular embodiments, server 20 maintains received configuration information 70, server configuration information 72, server software modules 50, license information 80, in memory 120a, while client 30 maintains client configuration information 74 and client software modules 60 in memory 120b. Memories 120 may represent any collection and arrangement of volatile or non-volatile, local or remote devices suitable for storing data such as, for example, random access memory (RAM) devices, read only memory (ROM) devices, magnetic storage devices, optical storage devices, or any other suitable data storage devices. In particular embodiments, memories 120 may comprise removable media, such as compact discs, magnetic tapes, or diskettes.

Network interfaces 130a and 130b (referred to generically as "network interfaces 130" collectively or a "network interface 130" singularly) each comprise an interface operable to facilitate communication between server 20 or client 30 and network 40. Network interfaces 130 may include any appropriate combination of hardware and/or software suitable to facilitate interaction between server 20 or client 30 and other components of system 10. In particular embodiments, each network interface 130 may comprise a Network Interface Card (NIC), and any appropriate controlling logic, that is suitable to support communication between server 20 and client 30 over network 40 using the Ethernet or Token Ring protocol.

As noted above with respect to FIG. 1, user interface 22 facilitates interaction between a user of system 10 and server 20. As indicated above, user interface 22 may include components such as a keyboard, mouse, monitor, printer, display screen, and/or any other components appropriate to allow the user to input information into server 20 or receive information from server 20. As also noted above, client 30, in particular embodiments, may also include or be coupled to an appropriate form of user interface.

FIG. 3 is a flowchart illustrating in greater detail an example operation of a particular embodiment of serve 20. Any of the steps illustrated in FIG. 3 may be combined, modified, or deleted where appropriate, and additional steps may also be added to the described operation. Additionally, steps may be performed in any suitable order without departing from the scope of the invention.

Operation of server 20 begins at step 300 with server 20 receiving configuration information 70. At step 310, server 20 receives one or more server software modules 50 and one or more client software modules 60. In general, server 20 may receive configuration information 70 and software modules 50 and 60 in any appropriate manner including, but not limited to, by receiving this information from a user through an appropriate user interface, retrieving this information from memory, and/or receiving this information automatically from another component of system 10.

At step 320, server 20 generates one or more sets of server configuration information 72 and one or more sets of client configuration information 74 based on configuration information 70 received by server 20. As noted above, server 20 may generate server configuration information 72 and client configuration information 74 by processing configuration information 70 in any appropriate manner. In particular embodiments, each set of server configuration information 72 and each set of client configuration information 74 represents a portion of configuration information 70. In such embodiments, server 20 may generate client configuration information 74 by identifying appropriate portions of configuration information 70 relevant to the installation or use of each software application to be installed and generating a set of server configuration information 72 and client configuration information 74 for each software application that includes the portions identified as relevant for that software application. Additionally, in particular embodiments, server 20 may store a set of server configuration information 72 and a set of client configuration information 74 for each software application to be installed in a configuration profile 76 associated with that software application.

At step 330, server 20 installs a server software module 50 on server 20. Server 20 then configures itself with respect to operation of the server software module based on server configuration information 72 associated with that server software module 50 at step 340. As one example, in particular embodiments, server may configure itself to use certain ports when communicating with clients 30 as part of the operation of the software application associated with the installed server software module 50.

Server 20 may, at step 350, identify one or more clients 30 associated with the server software module 50 installed during step 330. In particular embodiments, server 20 may identify the appropriate clients 30 based on an appropriate portion of the received configuration information 70, additional instructions provided by the user, and/or any other appropriate information available to server 20. Server 20 may then transmit a client software module 60 to identified clients at step 360. In particular embodiments, server 20 also transmits a set of client configuration information 74 corresponding to the transmitted client software module 60 to the identified clients at step 370.

Server 20 then initiates installation of the client software module 60 on the identified clients 30 at step 380. Clients 30 then install client software module 60. At step 390, server 20 may also initiate configuration of the clients 30 based on the client configuration information 74 by either directly configuring the client or by instructing the identified clients 30 to configure themselves based on the client configuration information 74. For example, in particular embodiments, server 20 may initiate installation and configuration of identified clients 30 by communicating an executable file to the identified clients 30 and instructing clients 30 to execute the file. In such embodiments, the executable file may, when executed, both install client software module 60 and configure client 30.

After initiating installation and any appropriate configuration of client software modules 60, server 20 determines, at step 400, whether additional software applications remain to be installed. If so, operation of server 20 may return to step 330. If not, operation may end, as shown in FIG. 3.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for installing software, comprising:
   a network operable to couple a server and a plurality of clients;
   each client of the plurality of clients operable to execute instructions associated with one or more client software modules; and
   the server, operable to:
      receive a plurality of sets of configuration information;
      store each set of configuration information in a configuration profile, wherein each configuration profile is associated with a first server software module, a second server software module, a first client software module, and a second client software module;
      read at least a first portion of a first set of configuration information from a first configuration profile;
      identify a subset of clients from among the plurality of clients based on the configuration information;
      install the first server software module associated with the first configuration profile based on the read portion of the first set of configuration information;
      after installing the first server software module on the server, install the second server software module on the server based on a second portion of the first set of configuration information and without receiving any additional configuration information;
      transmit the first client software module associated with the first set of configuration information to the identified subset of clients;
      initiate, from the server, installation of the first client software module on the identified subset of clients; and
      initiate, from the server, installation of the second client software module on at least one of the identified subset of clients, wherein the second client software module is associated with the second server software claim model;
      configure the identified subset of clients based on at least one of the sets of configuration information stored in the configuration profile associated with the first client software module transmitted to the identified subset of clients; and
      configure the at least one of the identified subset of clients based on at least one of the sets of configuration information stored in the configuration profile associated with the second client software module.

2. The system of claim 1, wherein each of the identified subset of clients is further operable to:
   receive the client software module; and
   install the client software module on that particular client.

3. The system of claim 1, wherein the first server software module and the second server module comprise different software modules selected from a group comprising a security software module, a data-migration software module, a virus-protection software module, and a data-recovery software module.

4. A method for installing software, comprising:
   receiving a plurality of sets of configuration information;
   storing each set of configuration information in a configuration profile, wherein each configuration profile is associated with a first server software module, a second server software module, a first client software module, and a second client software module;
   reading at least a first portion of a first set of configuration information from a first configuration profile;
   identifying a subset of clients from among a plurality of clients based on the configuration information;
   installing the first server software module associated with the first configuration profile based on the portion of the first set of configuration information;
   after installing the first server software module on the server, installing the second server software module on the server based on a second portion of the first set of configuration information and without receiving any additional configuration information;
   transmitting a client software module associated with the first set of configuration information to the identified subset of clients;
   initiating, from the server, installation of the first client software module on the identified subset of clients;
   initiating, from the server, installation of the second client software module on at least one of the identified subset of clients, wherein the second client software module is associated with the second server software module;
   configuring the identified subset of clients based on at least one of the sets of configuration information stored in the configuration profile associated with the first client software module transmitted to the identified subset of clients;
   configuring the at least one of the identified subset of clients based on at least one of the set of configuration information stored in the configuration profile associated with the second client software module.

5. The method of claim 4, further comprising installing, at the identified subset of clients, the client software module.

6. The method of claim 4, wherein the first server software module and the second server module comprise different software modules selected from a group comprising a security software module, a data-migration software module, a virus-protection software module, and a data-recovery software module.

7. A computer program stored on a non-transitory computer-readable storage medium, the computer program operable when executed on a processor to implement the method of:
receiving a plurality of sets of configuration information;
storing each set of configuration information in a configuration profile, wherein each configuration profile is associated with a first server software module, a second server software module, a first client software module, and a second client software module;
reading at least a first portion of a first set of configuration information from a first configuration profile;
identifying a subset of clients from among a plurality of clients based on the configuration information;
installing the first server software module associated with the first configuration profile based on the portion of the first set of configuration information;
after installing the first server software module on the server, installing the second server software module on the server based on a second portion of the first set of configuration information and without receiving any additional configuration information;
transmitting the first client software module associated with the first set of configuration information to the identified subset of clients;
initiating, from the server, installation of the first client software module on the identified subset of clients;
initiating, from the server, installation of the second client software module on at least one of the identified subset of clients, wherein the second client software module is associated with the second server software module;
configuring the identified subset of clients based on at least one of the sets of configuration information stored in the configuration profile associated with the first client software module transmitted to the identified subset of clients; and
configuring the at least one of the identified subset of clients based on at least one of the sets of configuration information stored in the configuration profile associated with the second client software module.

8. The computer program of claim 7, wherein the computer program is further operable to install, at the identified subset of clients, the client software module.

9. The computer program of claim 7, wherein the first server software module and the second server module comprise different software modules selected from a group comprising a security software module, a data-migration software module, a virus-protection software module, and a data-recovery software module.

10. A system for installing software, comprising:
means for receiving a plurality of sets of configuration information;
means for storing each set of configuration information in a configuration profile, wherein each configuration profile is associated with a first server software module, a second server software module, a first client software module, and a second client software module;
means for reading at least a first portion of a first set of configuration information from a first configuration profile;
means for identifying a subset of clients from among a plurality of clients based on the configuration information;
means for installing the first server software module associated with the first configuration profile based on the portion of the first set of configuration information;
means for, after installing the first server software module on the server, installing the second server software module on the server based on a second portion of the first set of configuration information and without receiving any additional configuration information;
means for transmitting the first client software module associated with the first set of configuration information to the identified subset of clients;
means for initiating, from the server, installation of the first client software module on the identified subset of clients;
means for initiating, from the server, installation of the second client software module on at least one of the identified subset of clients, wherein the second client software module is associated with the second server software module;
means for configuring the identified subset of clients based on at least one of the sets of configuration information stored in the configuration profile associated with the first client software module transmitted to the identified subset of clients; and
means for configuring the at least one of the identified subset of clients based on at least one of the sets of configuration information stored in the configuration profile associated with the second client software module.

11. The system of claim 1, wherein the plurality of sets of configuration information comprises information identifying authorized users and corresponding passwords of the users.

12. The system of claim 1, wherein the plurality of sets of configuration information comprises port mappings for communication between the server and the plurality of clients.

13. The system of claim 1, wherein the plurality of sets of configuration information comprises software update schedules for the client software modules and the server software modules.

14. The system of claim 1, wherein the plurality of sets of configuration information comprises data backup schedules for the plurality of clients and the server.

15. The system of claim 1, wherein the plurality of sets of configuration information comprises virus definitions.

16. The system of claim 1, wherein the plurality of sets of configuration information comprises firewall settings for the plurality of clients and the server.

17. The system of claim 1, wherein the plurality of sets of configuration information comprises address information selected from the group consisting of mail servers, proxy servers, domain name system servers, and dynamic host configuration protocol services.

18. The system of claim 1, wherein the plurality of sets of configuration information comprises information specifying protocols supported at least one of the server and the plurality of clients.

19. The system of claim 1, wherein the plurality of sets of configuration information comprises license information associated with one or more of the applications supported at least one of the server and the plurality of clients.

* * * * *